Figure 1:
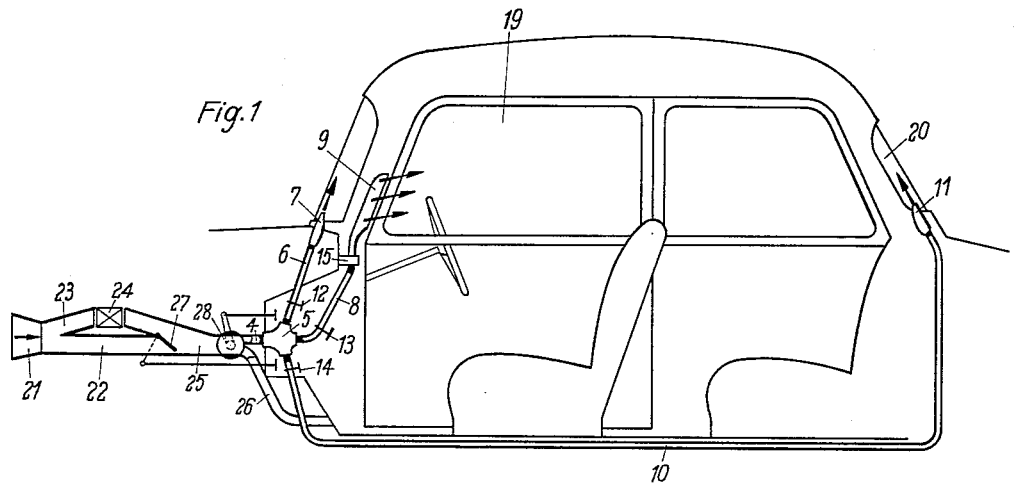

May 22, 1956     F. K. H. NALLINGER     2,746,100
WINDOW DEFROSTING INSTALLATION
Filed May 18, 1950

Inventor
Friedrich K. H. Nallinger
By Hицке and Padlon
Attorneys

# United States Patent Office 2,746,100
Patented May 22, 1956

2,746,100
WINDOW DEFROSTING INSTALLATION

Friedrich K. H. Nallinger, Stuttgart-N, Germany, assignor to Daimler-Benz Aktiengesellschaft, Stuttgart-Unterturkheim, Germany Application May 18, 1950, Serial No. 162,664

Claims priority, application Germany May 20, 1949

2 Claims. (Cl. 20—40.5)

The present invention relates to a de-frosting installation for vehicles, especially for motor vehicles and contemplates an improved utilization and formation of such an installation, especially with the end to improve the view from within the vehicle and to increase the traffic safety.

The present invention is based on the experience that the de-frosting system of the windshield alone which was provided up to this time is in many cases not sufficient. Thus it is extremely disturbing, especially in town traffic, if, for instance, at a sharp curve into side streets the view through the side panes of the vehicle is prevented by an opaque stratum. The same problem arises when driving backward, if the rear window has become opaque.

Accordingly, an essential feature of the present invention particularly resides in that also the side panes, especially the front side panes and/or the rear window, are de-frosted. Fresh air is preferably used for this purpose which is suitably heated beforehand. As a result of such an arrangement an essentially more efficient de-frosting is obtained than, for instance, by the use of recirculated air from the eventually heated passenger space which has been humidified by the persons inside the vehicle and is, therefore, not certain to prevent fogging of the windows, i. e., the formation of an opaque stratum on the inside of the side windows even with a slight frost only.

The present invention enables full observation of the proceedings in the street also on both sides of the vehicle and/or to the rear thereof, untroubled by a stratum of frost on the panes is made possible and thus the driving safety, especially in sharp curves and when driving backward, is essentially increased.

For de-frosting—especially for the rear pane—de-frosting nozzles may be used of the generally known type whose mouth or orifice is arranged along the lower edge of the window. For defrosting the front side panes, however, de-frosting nozzles with an air outlet at the side are suitably arranged, for example, parallei to the front pane edge of the side window or parallel to the front corner pillars of the body of the car.

Figure 2:
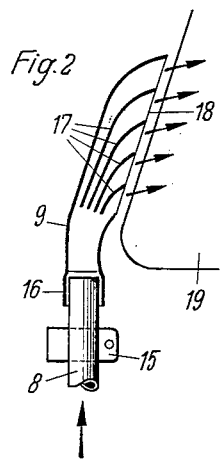
Figure 3:
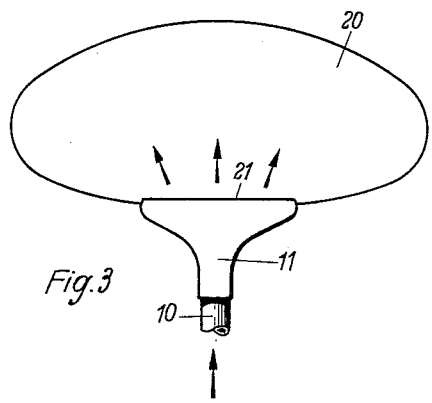

Further details and features of the invention can be seen from the description of an example schematically shown in the drawing, wherein:

Fig. 1 is a schematic longitudinal section through the passenger space of a motor car, Fig. 2 is a section through a de-frosting nozzle arranged at the front side window, on an enlarged scale with respect to Fig. 1 and Fig. 3 is a view upon the rear window of the car.

The air used for de-frosting, especially fresh air, is fed through a line 4 which forms a branch line for instance of the heating line of the body, or ahead of which a heating device can be arranged. The main radiator of the vehicle, a special heat exchanger or another suitable heating plant, for instance, of the electric type, may serve as such a heating device.

In the construction according to the present invention a fresh air line system serves for this purpose, consisting of the inlet port 21, the branch lines 22, 23 and the mixing line 25. In the branch line 23 a heat exchanger 24 is arranged which obtains its heat, for instance, from the cooling water of the engine and transfers it to the air flowing through the line 23. The valve member 27 which can be operated from the driver's seat serves to valve the mixture of hot and cold air. A second valve member 28 which can also be operated by the driver distributes the air from the mixing line 25 to the heating line 26 to heat the inside of the car and to the de-frosting line 4.

In the distributor piece 5 the line 4 is divided into several branch lines, three of which are for instance shown, and in this case the line 6 leads to the nozzle 7 at the windshield, the line 8 to the nozzle 9 at the front edge of the front side window and the line 10 to the nozzle 11 at the rear window of the car. For de-frosting the opposite (left) side window a line corresponding to the line 8 with a de-frosting nozzle corresponding to the nozzle 9 may be provided. Stop cocks 12, 13, 14 may be arranged to block flow to the nozzles 7, 9 or 11 individually from the feed line 4. If desired, the blocking may also be effected by a common valve member arranged, for instance, in the distributor 5, which enables different positions for an arbitrary opening or blocking of flow to the different nozzles or a complete or partial blocking of flow to the nozzles.

The nozzle 9 and the line 8 for the latter are fastened to a rigid portion of the vehicle chassis, such as, for instance, at the front wall of the vehicle body, at point 15 of the switch board, at the front corner pillar of the body or the like. It extends essentially parallel to the front edge of the front side window or parallel to the front corner pillar. By means of an axial connecting piece 16 the nozzle 9 is mounted—suitably tightly—on the end of the line 8 and may, if necessary, be fixed thereon additionally against rattling or loosening in any suitable way.

In the nozzle 9 several air guide plates 17 are arranged whose ends are bent towards the nozzle mouth 18.

The air flowing out of the nozzle mouth in a broad stream, which is suitably heated beforehand, streams along the window pane 19 of the side window; in this case the air guide plates 17 follow or counteract the tendency of upward movement of the hot air by letting part or most of the air flow out in that part of the nozzle next to the connecting piece 16. In this way a uniform de-frosting over the entire height of the window pane 19 can be realized. In some cases, for instance, by a corresponding size of the nozzle or by a corresponding quantity of supplied air provision can be made to de-frost and thus to clear the window pane over a larger or smaller part of its width, or over its entire width instead of de-frosting its front part only.

If the corner pillar of the body of the car is wide enough, instead of a de-frosting nozzle fed with hot air from the side also a nozzle fed with air from the centre of the nozzle can be used, as it is the case for instance at the rear window 20 with its de-frosting nozzle 11, in Fig. 3. In this case the nozzle is arranged in the middle of the window 20 in such a way that the nozzle mouth 21 ends at about the lower edge of the window. The air is fed to the de-frosting nozzle by the pipe 10.

Instead of the described and shown installations to de-frost the window panes other installations of different construction may also be used within the scope of the invention, for instance, electric hot air blowers or the like, the invention not being limited to the specific embodiments described hereinabove.

What I claim is:

1. In a motor vehicle with a rigid chassis portion and a side door movable relative to said rigid chassis portion, a windshield extending transversely of the vehicle, a door window in said side door adjacent said windshield, a conduit with heat exchanger means for conducting heated air to said windshield, an uninterrupted branch conduit branching off from said first-mentioned conduit and extending toward said door window from below thereof to conduct heated air to said door window from below thereof, a discharge nozzle connected to the free end of said uninterrupted branch conduit, means for supporting said discharge nozzle on said rigid chassis portion of the vehicle, said branch conduit and said discharge nozzle being located exclusively within said rigid chassis portion of the vehicle to remain unaffected by movement of said side door, said nozzle extending along the front side edge of said door window, and said discharge nozzle including a plurality of subdividing guide plates arranged in super-posed relationship in the direction of air flow for changing the flow of warm air from its upward direction in said branch conduit into a plurality of substantially parallel layers flowing in an approximately horizontal direction along said side window, whereby warm air is discharged against and along the window surface.

2. In a motor vehicle, the combination according to claim 1, wherein said rigid chassis portion consists of a front corner pillar of the vehicle body, further comprising a rear window in said vehicle, another uninterrupted branch conduit connected to said first-mentioned conduit for conducting heated air to said rear window, and another discharge nozzle connected to the free end of said another branch conduit along the bottom edge of said rear window.

References Cited in the file of this patent

UNITED STATES PATENTS

| | | |
|---|---|---|
| 2,044,488 | Wendt et al. | June 16, 1936 |
| 2,045,826 | Benolken | June 30, 1936 |
| 2,150,110 | Strauss et al. | Mar. 7, 1939 |
| 2,175,280 | Paton | Oct. 10, 1939 |
| 2,258,922 | Albee | Oct. 14, 1941 |
| 2,295,750 | Norris et al. | Sept. 15, 1942 |
| 2,314,078 | Crawford | Mar. 16, 1943 |
| 2,492,506 | Stinnett | Dec. 27, 1949 |
| 2,606,074 | Ackerman | Aug. 5, 1952 |

FOREIGN PATENTS

| | | |
|---|---|---|
| 455,369 | Great Britain | July 15, 1936 |